(12) United States Patent
Hakomori

(10) Patent No.: US 6,261,160 B1
(45) Date of Patent: Jul. 17, 2001

(54) METHOD AND APPARATUS FOR SPECULAR-POLISHING OF WORK EDGES

(75) Inventor: Shunji Hakomori, Tokyo (JP)

(73) Assignee: Speedfam Co., Ltd., Tokyo (JP)

( * ) Notice: Subject to any disclaimer, the term of this patent is extended or adjusted under 35 U.S.C. 154(b) by 0 days.

(21) Appl. No.: 09/148,608

(22) Filed: Sep. 4, 1998

(30) Foreign Application Priority Data

Sep. 11, 1997 (JP) ........................................... 9-264878

(51) Int. Cl.[7] .................................................. B24B 9/08
(52) U.S. Cl. .............................. 451/66; 451/43; 451/209; 451/210; 451/254; 451/362
(58) Field of Search ........................... 451/43, 44, 65, 451/66, 194, 209, 210, 232, 254, 258, 339, 362

(56) References Cited

U.S. PATENT DOCUMENTS

| 5,097,630 | * | 3/1992 | Maeda et al. | |
| 5,117,590 | * | 6/1992 | Kudo et al. | |
| 5,514,025 | * | 5/1996 | Hasegawa et al. | 451/44 |
| 5,547,415 | * | 8/1996 | Hasegawa et al. | 451/44 |
| 5,658,189 | * | 8/1997 | Kagamida | 451/66 |
| 5,674,110 | * | 10/1997 | Cuoghi | 451/44 |
| 5,816,897 | * | 10/1998 | Raeder et al. | 451/44 |

FOREIGN PATENT DOCUMENTS 64-71656    3/1989    (JP).

\* cited by examiner

Primary Examiner—Timothy V. Eley
(74) Attorney, Agent, or Firm—Snell & Wilmer, L.L.P.

(57) ABSTRACT

A polishing apparatus comprises a rotating table intermittently rotating through 120°0 increments; three polishing drums and three work-holding means 12 provided on the rotating table; a handling means for unloading a processed work from the work-holding means at a handling position and supplying an unprocessed work to the work-holding means at the same position; and a work-inverting means for inverting a work, the front-plane-side edge of which has been polished, at a front-plane edge polishing position.

7 Claims, 3 Drawing Sheets

METHOD AND APPARATUS FOR SPECULAR-POLISHING OF WORK EDGES

FIELD OF THE INVENTION

The present invention relates to an apparatus for the specular polishing of the chamfered outer circumference edges of a semiconductor wafer, a magnetic disc substrate, an optical-disc substrate, or other characteristically disc-shaped work.

PRIOR ART

As an example, a semiconductor wafer such as a silicon wafer generally has its periphery chamfered to prevent the chipping of its edge and crown during epitaxial growth. The chamfering is done by polishing the wafer with a diamond grindstone. However, this polishing often leaves a process-distorted layer, which may produce a crystal defect during repeated thermal treatment in a device process.

The process-distorted layer is customarily removed by etching, but etched surfaces tend to demonstrate a wavy or scale-like pattern, with projecting and recessed areas susceptible to staining. Such stains may be dispersed over the entire wafer during the device process, degrading the characteristics of the device.

A relatively new technique for specular polishing has recently been established as a way of polishing a chamfered wafer edge. The technique takes an approach that departs significantly from wafer-surface polishing techniques. This applicant has also proposed a technique for polishing edges, disclosed, for example, in Japanese Patent Application Laid Open No. 1-71656. This polishing technique rotates a wafer having a chamfered edge on its circumferential surface while pressing its circumferential edge against a working surface on the outer circumference of a rotating polishing drum. This method enables simple and reliable polishing of the wafer edge, resolving the problems associated with chamfering.

However, a polishing apparatus of this kind contacts a wafer at one point with one polishing drum, an arrangement that limits processing efficiency and requires a relatively long time for processing. Currently, this inefficiency can be reduced somewhat by increasing the diameter of the polishing drum, which in turn increases its contact area upon the wafer and thus reduces processing time.

However, for this method of externally contacting a circular wafer with a cylindrical polishing drum, the degree to which the contact area can be increased and polishing time reduced is limited. Increasing the diameter of the polishing drum also increases the required installation space and the size of the apparatus. Trends are soon expected to bring a demand for larger wafers with diameters of 30 to 40 cm, which would require even larger polishing apparatuses.

DISCLOSURE OF THE INVENTION

A main object of this invention is to provide a polishing apparatus having high processing efficiency, capable of simultaneously specularly polishing the circumferential edges of a work at a number of points.

Another object of this invention is to provide a productive polishing apparatus capable of simultaneously and continuously specularly polishing the circumferential edges of a number of works.

To achieve these objectives, this invention provides a specular-polishing apparatus having, on a rotating table intermittently rotating from a handling position to a front-plane-side edge processing position to a rear-plane-side edge processing position, a number of polishing drums for simultaneously specularly polishing the circumferential edges of a work at a number of points and a number of work-holding means for holding a disc-shaped work having chamfered circumferential edges on its front and rear planes to allow the polishing drums to contact the edges of the work.

In a polishing apparatus of this configuration, when a handling means supplies an unprocessed work to the work-holding means at the handling position, the rotating table rotates through a specified angle to move the work-holding means to the front-plane-side edge processing position. At this position, the front-plane-side edge is simultaneously pressed against the polishing drums.

Once the front-plane-side edge of the work has been polished, a work-inverting means turns the work upside down and the rotating table rotates to move the work-holding means to a rear-plane-side edge processing position. At this position, the rear-plane-side edge of the work is pressed against the rotating polishing drums for specular polishing.

Once the rear-plane-side edge of the work has been polished, the rotating table rotates to return the work-holding means to the handling position, where the handling means unloads the processed work and supplies an unprocessed work. This process is then repeated for specular polishing of the edges of an unprocessed work.

Thus, according to this invention, the circumferential edges of the work are contacted simultaneously by a number of polishing drums and specularly polished at a number of points, thereby improving processing efficiency and reducing the time required for processing. In addition, a number of work-holding means can simultaneously and continuously process a number of works, thereby improving productivity.

According to a specific embodiment of this invention, the specular-polishing apparatus has three polishing drums and three work-holding means, wherein each work-holding means is disposed at a position intermediate between two adjacent polishing drums so as to move in the radial direction of the rotating table.

According to a preferable embodiment of this invention, the work-holding means has a pressing means for setting the pressure used to polish a work and an alignment mechanism for even contact of the work with the two polishing drums.

The pressing means consists of a weight hanging from the work-holding means, and the alignment mechanism is composed of a slide member and a rail supporting the work-holding means in such a way that the means can be moved in a direction parallel to a line joining the centers of the two polishing drums.

According to this invention, the alignment mechanism preferably has a means for absorbing the force resulting from the contact between the two polishing drums and the work to displace the work-holding means to one of the polishing drums, using an impelling force opposed to the initial force.

Ideally, the polishing drums and the work-holding means can be moved relative to the axial direction of the polishing drums to vary the position in which the work contacts the drums.

DETAILED DESCRIPTION

Figure 1:
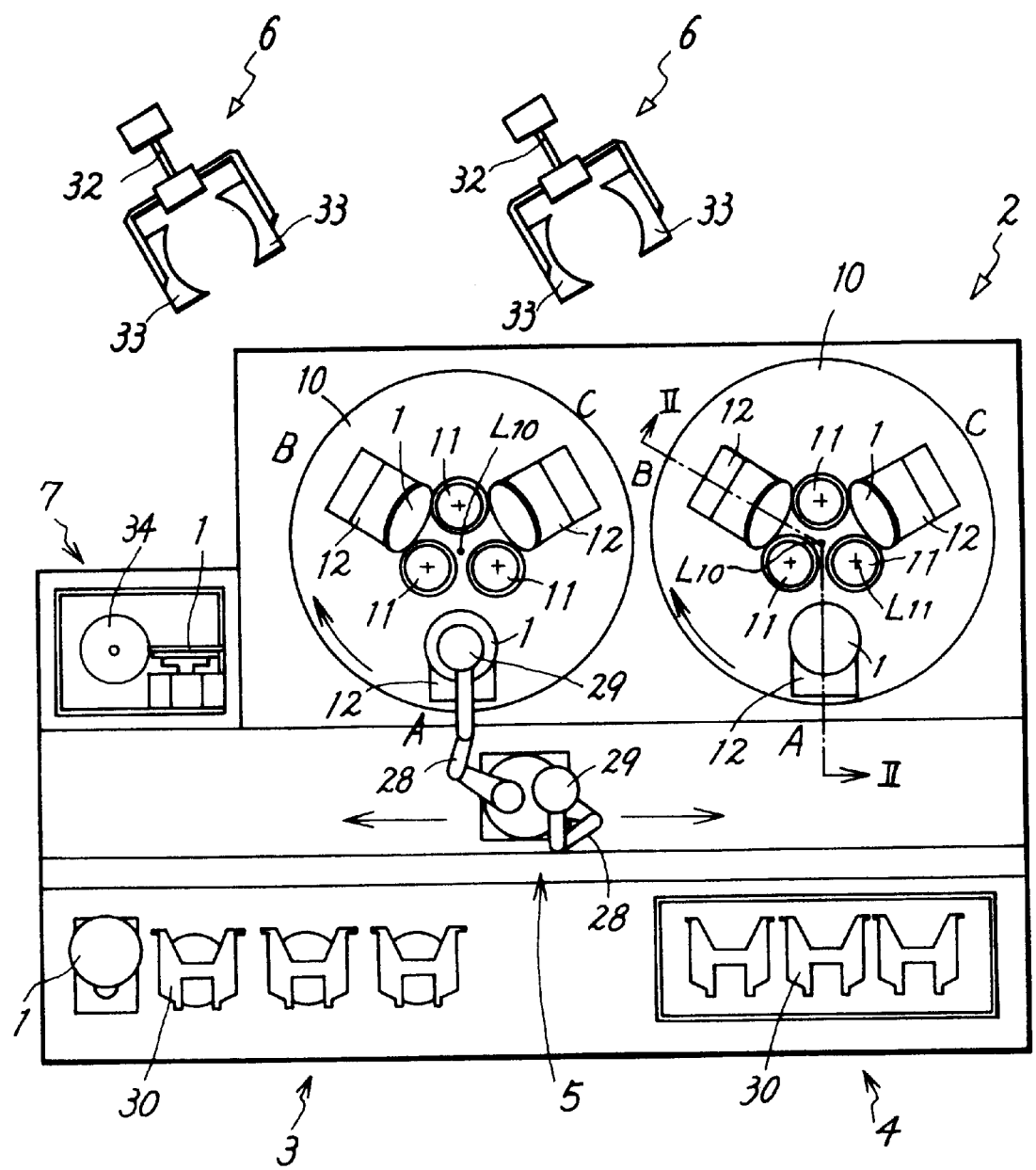
FIG. 1 is a top view showing Embodiment 1 of a polishing apparatus according to this invention.
Figure 3:
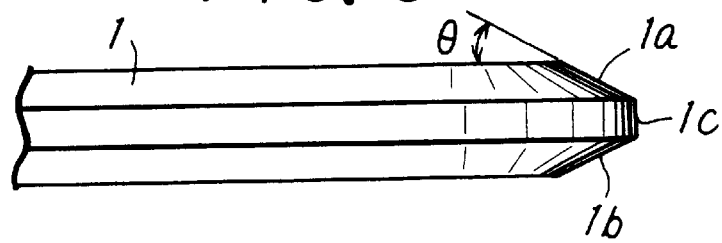
FIG. 3 is an enlarged view of the integral part of a work.

FIG. 1 shows a first embodiment of a polishing apparatus according to this invention, comprising a polishing section 2 for polishing circumferential edges 1a and 1b of a work 1 (see FIG. 3); a loader section 3 acting as a base for supplying an unprocessed work to the polishing section 2; an unloader section 4 acting as a base for unloading a processed work from polishing section 2; a handling means 5 for supplying an unprocessed work from the loader section 3 to polishing section 2 and for transferring a processed work from polishing section 2 to unloader section 4; and a work-inverting means 6 for inverting a work for which polishing section 2 has finished polishing its front-plane-side edge.

In the polishing section 2, two circular rotating tables 10, 10, are disposed to rotate around a central axis $L_{10}$ and are intermittently driven and rotated through a specified angle (in the illustrated example, 120°) by a drive means, such as a motor (not shown). The rotating tables 10 may be periodically rotated with the same timing or a synchronously rotated with different timings, depending on processing conditions.

Three cylindrical polishing drums 11 are disposed near the center of rotating table 10 around central axis $L_{10}$ of table 10 at an interval of 120°, in such a way as to be driven and rotated around their own axes $L_{11}$, and to oscillate along the axial direction. In the polishing drum 11, a polishing pad is affixed to the circumferential surface of its base cylinder to allow the circumferential surface to be used as a working surface for specular polishing. The gap between the two adjacent polishing drums 11, 11, is kept narrower than the diameter of work 1 to allow one of circumferential edges 1a or 1b of one work 1 to contact the two polishing drums 11, 11, simultaneously.

In addition, three work-holding means 12 are radially disposed around the three polishing drums 11 at an interval of 120°.

The phase of the work-holding means 12 is offset 60° from that of the polishing drums, so that each work-holding means 12 is positioned exactly intermediate between the two adjacent polishing drums 11, 11.

Each work-holding means 12 holds the disc-shaped work 1 (FIG. 3) that has on its front and rear planes circumferential edges 1a and b chamfered at angle θ, with the holding means rotating the work around the axis while simultaneously contacting either circumferential edge 1a or 1b of the work with the working surfaces of the two adjacent polishing drums 11, 11. The work-holding means 12 has the same configuration, and has the following specific configuration.

Figure 2:
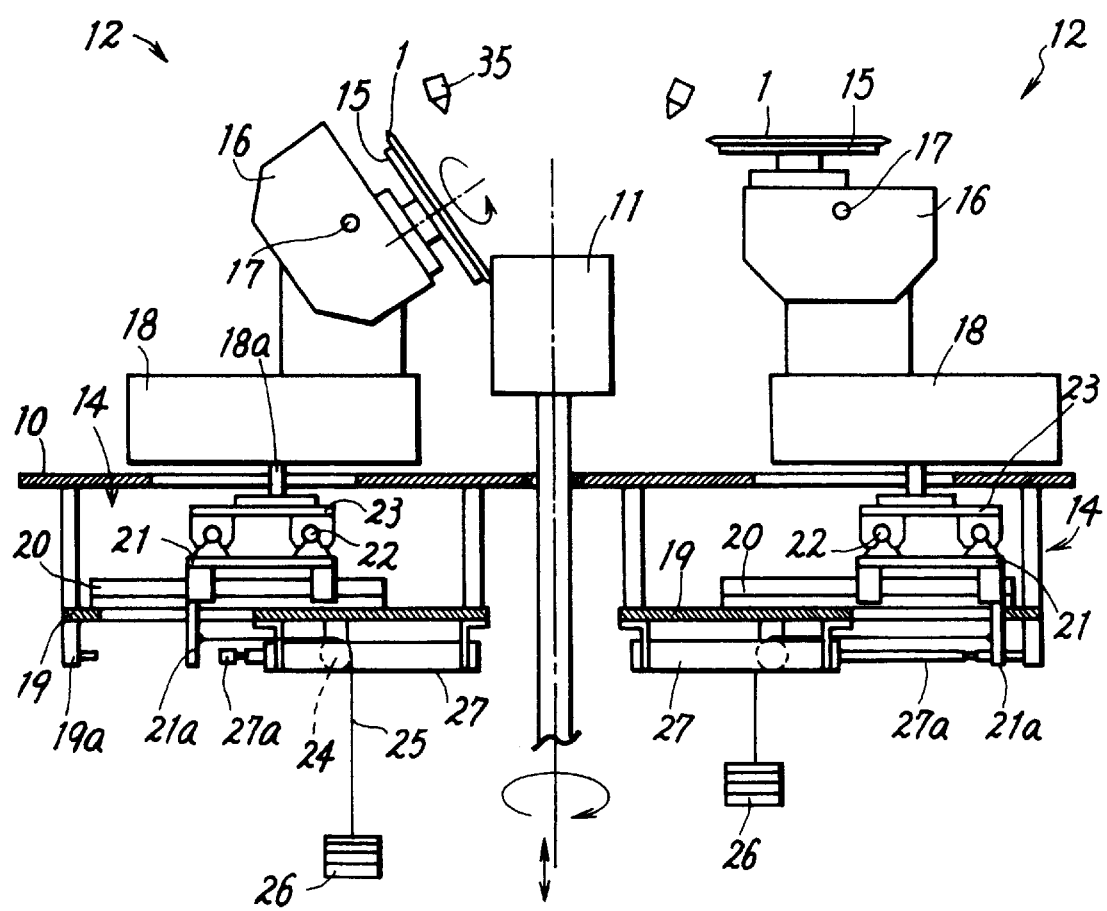
FIG. 2 is an enlarged sectional view taken along line II—II in FIG. 1.

As shown in FIG. 2, the work-holding means 12 has a chuck head 15 that vacuum chucks work 1; a first body 16 that holds chuck head 15 to permit rotation; and a second body 18 that supports first body 16 to allow body 16 to tilt around a supporting shaft 17. The second body 18 is supported by a supporting mechanism 14 in such a way as to move in the radial direction of the rotating table 10, that is, the direction in which body 18 approaches and leaves polishing drums 11, 11, and in a direction orthogonal to the radial direction, that is, a direction parallel to a line joining the centers of the two adjacent polishing drums 11, 11.

The supporting mechanism 14 has a first rail 20 provided on a base plate 19 fixed to the bottom surface of rotating table 10, extending in the radial direction of the rotating table 10; a first slide member 21 that can move along first rail 20; a second rail 22 provided on the first slide member 21 in a direction orthogonal to first rail 20; and a second slide member 23 that can move along second rail 22. The second body 18 is mounted on second slide member 23 using a leg 18a.

In addition, a pulley 24 is attached to the bottom surface of base plate 19, and a wire 25 is passed around pulley 24. One end of wire 25 is fixed to an arm 21a extending downward from first slide member 21, and a weight 26 hangs from the tip of wire 25 so that the mass of weight 26 causes the first slide member 21 and thus the work-holding means 12 to be impelled toward polishing drum 11 on first rail 20. Weight 26 constitutes a drive source to advance work-holding means 12 toward polishing drums 11, and a pressing means for pressing work 1 against polishing drums 11 during edge polishing at a specified processing pressure.

An air cylinder 27 is mounted on the bottom surface of base plate 19, and the tip of air cylinder 27 abuts arm 21a so that air cylinder 27 causes the first slide member 21 and thus work-holding means 12 to retreat along the direction in which they are spaced from polishing drums 11.

In the FIGURE 19a is a stopper defining a retreat position for arm 21a.

Chuck head 15 has on its surface a number of suction apertures connected to a vacuum source via ports and tubes provided in the first and second bodies. An illustration of these components is omitted. Chuck head 15 is connected to a motor provided in first body 16 and is driven at low speed, a single rotation per 40 to 60 seconds during edge polishing, for example.

In addition, first body 16 inclines between a non-polishing position at which chuck head 15 faces in the horizontal direction to hold work 1 at a position spaced from polishing drums 11, as shown in the right half of FIG. 2; and a polishing position at which chuck head 15 tilts to contact edges 1a and 1b of work 1 with polishing drums 11, as shown in the left half of the FIGURE. When first body 16 is located at the non-polishing position, work-holding means 12 is impelled backward in the circumferential direction of rotating table 10 by air cylinder 27; that is, along the direction in which it leaves polishing drums 11.

In addition, handling means 5 has two telescopic chuck arms 28, 28, including a chuck head holding the work, disposed so as to move between polishing section 2 and loader section 3 and unloader section 4. The chuck arm supplies an unprocessed work from loader section 3 to work-holding means 12 at handling position A, and transfers a processed work to unloader section 4. Reference number 30 designates a cassette in which a work is accommodated.

Furthermore, work-inverting means 6 comprises a telescopic chuck arm 32 that can be turned upside down and includes at its tip a pair of closing chuck members 33, 33, for chucking the outer circumference of work 1. Work-inverting means 6 is disposed at a point corresponding to a front-plane edge polishing position B to invert work 1, the front-plane-side edge 1a of which has been polished.

In the FIGURE, 7 shows a notch-processing section fitting the outer circumference of disc-shaped polishing member 34 in a V-shaped notch formed in the outer circumference of work 1 for polishing. This section is unrelated to the essence of this invention, and its description is omitted.

In a polishing apparatus of this configuration, when the handling means 5 supplies an unprocessed work from loader section 3 to work-holding means 12 at handling position A on rotating table 10, table 10 rotates clockwise through 120° in FIG. 1 to move work-holding means 12 to front-plane edge polishing position B.

When work-holding means 12 moves to front-plane edge polishing position B, first body 16, located at the non-polishing position, tilts forward and occupies the polishing position, and a rod 27a of air cylinder 27 contracts to allow work-holding means 12 to advance toward polishing drums 11 on first rail 20, as result of force applied by weight 26, thereby causing the front-plane-side edge 1a of the rotating work 1 to contact the two rotating polishing drums 11, 11, simultaneously, as shown in the left half of FIG. 2. Thus, edge 1a is specularly polished by polishing drums 11, 11, at two points of edge 1a simultaneously. At this point, polishing-material slurry is supplied from a nozzle 35. Additionally, during polishing, polishing drums 11 oscillate back and forth slowly along their axial direction $L_{11}$ to change the position in which they contact work 1.

The contact pressure of the work on polishing drums 11, 11, results from the mass of weight 26. That is, when rod 27a of air cylinder 27 contracts and work-holding means 12 advances on first rail 20 to press work 1 against polishing drums 11, 11, the work-holding means stops at that position, but rod 27a contracts a small further distance and leaves arm 21a of first slide member 21. Thus, the mass of weight 26 is applied all over work-holding means 12 to press work 1 against the two polishing drums 11, 11.

During its contact with polishing drums 11, 11, if work 1 is biased toward one drum, the second slide member 23 moves on the second rail 22 in the direction that equalizes the contact pressure of work 1 on both polishing drums 11, 11. As a result, first body 16 is automatically precisely positioned between the two polishing drums 11, 11, pressing work 1 against two polishing drums 11, 11 with consistent, even pressure. Thus, the second rail 22 and the second slide member 23 constitute an alignment mechanism for evenly pressing work 1 against two polishing drums 11, 11.

The configuration of the alignment mechanism is not limited to this embodiment, and chuck head 15 may be mounted on the first body in such a way as to permit a certain degree of freedom.

An alignment mechanism according to the above embodiment only supports work-holding means 12 so that means 12 can be displaced in the direction of a line joining the centers of the two polishing drums 11, 11. If, however, the two rotating drums 11, 11, contact work 1, the frictional force between the drums and the work may apply a tangential force upon work 1, displacing work-holding means 12 along second rail 22 and producing a sharp collision against one of the polishing drums. To prevent this, the alignment mechanism may include, as required, an impelling means to impel work-holding means 12 with a force opposed to the tangential force. This impelling means can be configured by suspending a weight from a side of work-holding means 12.

After a specified time period has passed and the polishing of the front-plane-side edge 1a is finished, work-holding means 12 is retracted by air cylinder 27 along first rail 20 to a position in the right half of FIG. 2 at which work 1 is separated from polishing drums 11, 11. At the same time, first body 16, which has been tilted, returns to the non-polishing position, where work 1 is turned upside down by work-inverting means 6.

Rotating table 10 again rotates 120° to move work-holding means 12 to a rear-plane edge polishing position C, where the rear-plane edge 1b of work 1 is simultaneously pressed against the two polishing drums 11, 11 for specular polishing in the same manner as said front-plane-side edge 1a.

Once the polishing of the rear-plane edge 1b of the work is finished, rotating table 10 rotates through 120° to return work-holding means 12 to handling means 5, where handling means 5 unloads the processed work and supplies an unprocessed work.

Similar steps are repeated for continuous specular polishing of the front-and rear-plane edges 1a and 1b of work 1.

A single work-holding means 12 has been described, but of course, the above polishing operation applies to and is sequentially performed in all work-holding means.

Ideally, the working surface of each polishing drum 11 is flexible enough to allow the circumferential surface 1c to cut into the drum by half or more of its width during the polishing of edges 1a and 1b. This enables the circumferential surface 1c of the work to be simultaneously polished while the front-and rear-plane edges 1a and 1b are being polished.

This polishing process can be carried out by synchronously rotating the two rotating tables 10, 10, with the same timing, or by asynchronously rotating them according to different timings.

Because this polishing apparatus contacts either circumferential edge 1a and 1b of work 1 with the two polishing drums 11, 11, for specular polishing of the edges at two points at once, processing efficiency is improved and the time required for processing reduced. In addition, a number of works can be simultaneously and continuously processed to improve productivity.

Although the above embodiment uses weight 26 to provide contact pressure for work 1 during polishing, a pressure-regulating air cylinder may be used in its place.

In addition, the apparatus may accommodate one to three additional rotating tables 10, in addition to the two here described.

Figure 4:
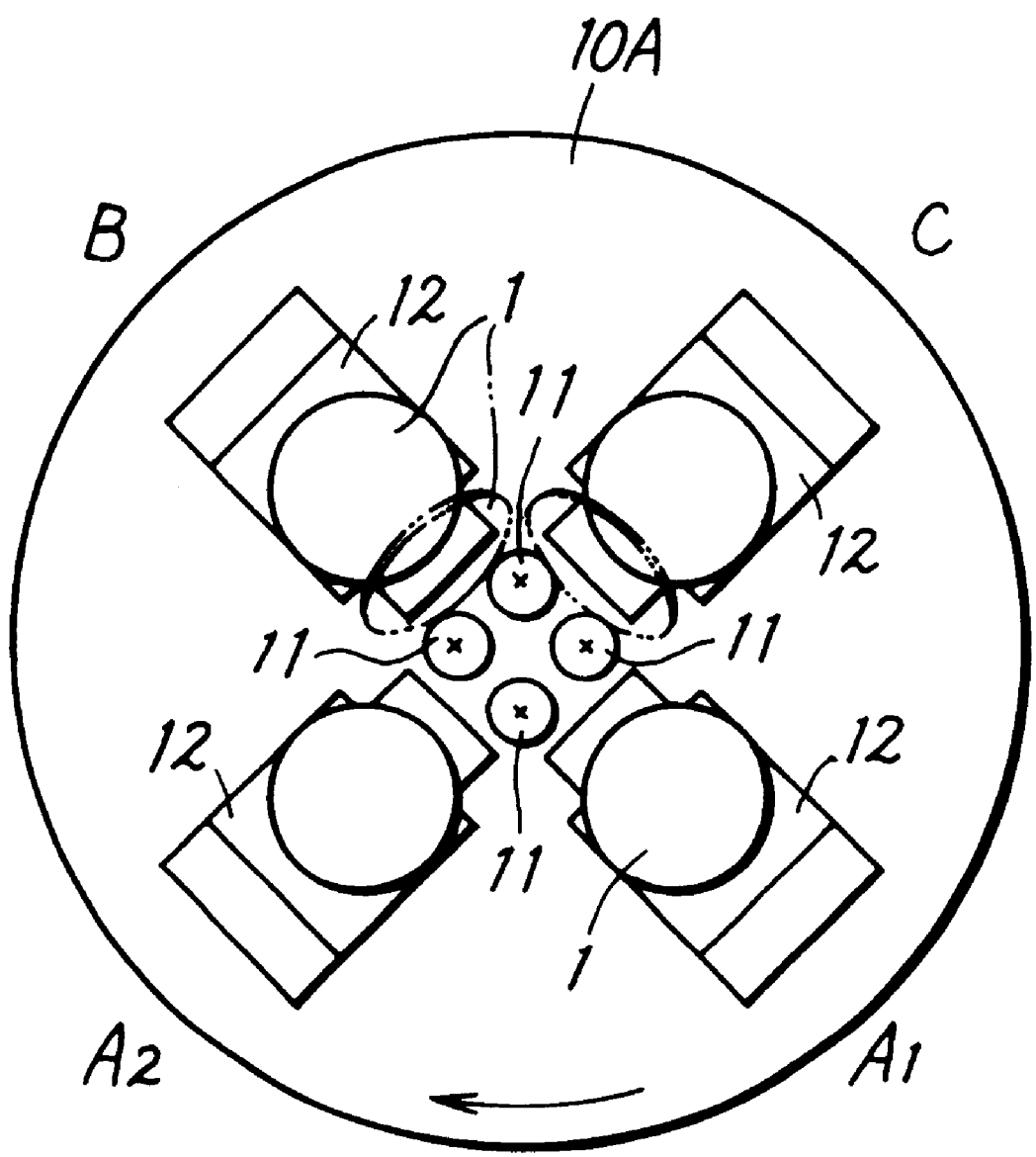
FIG. 4 is a top view of the integral part of a second embodiment of the polishing apparatus according to this invention.

FIG. 4 shows a rotating table 10A in a polishing apparatus according to a second embodiment of this invention. Four polishing drums 11 and four work-holding means 12 are provided on rotating table 10A to rotate table 10A intermittently in 90° increments in order to allow each work-holding means 12 to pass sequentially through a first handling position $A_1$, a second handling position $A_2$, the front-plane edge polishing position B, and the rear-plane edge polishing position C. In this case, a processed work is unloaded from the work-holding means 12 at the first handling position $A_1$, while an unprocessed work is supplied to work-holding means 12 at the second handling means $A_2$.

Aside from rotating table 10A, the configuration and effects or preferred modifications of the polishing apparatus components according to the second embodiment are substantially the same as in the first embodiment. A description is omitted.

This invention thus allows for the simultaneous contact of the circumferential edges of the work with a number of polishing drums for specular polishing of the edges at a number of points, thereby improving processing efficiency and reducing the time required for processing. In addition, productivity can be improved by simultaneously and continuously processing a number of works.

What is claimed:

1. A specular polishing apparatus for work edges, characterized in that the apparatus comprises:

a table rotatable around its central axis;

a plurality of polishing drums for simultaneous specular polishing of a circumferential edge of a work at a number of points, said polishing drums being disposed around the central axis of said rotatable table, each said polishing drum being configured to rotate around its own axis, said polishing drums having gaps between them that are narrower than the diameter of the work;

a plurality of work-holding means disposed around said polishing drums on said rotatable table at a specified interval so as to hold and rotate a disc-shaped work having a chamfered front-plane edge and a chamfered rear-plain edge while contacting one of said chamfered edges of the work simultaneously with a number of polishing drums;

said rotatable table having a drive means for intermittently rotating said rotatable table so that each work-holding means sequentially moves between a handling position, a front-plane edge processing position, and a rear-plane edge processing position;

a handling means for unloading a processed work from the work-holding means at said handling position and supplying an unprocessed work to said work holding position at said handling position; and a work-inverting means for inverting a work after its front-plane edge has been polished.

2. A specular polishing apparatus according to claim 1 characterized in that the apparatus has three polishing drums and three work-holding means, wherein each work-holding means is disposed at a position intermediate between two adjacent polishing drums so as to move in the radial direction of said rotating table.

3. A specular polishing apparatus according to claim 2, characterized in that each of said work-holding means has a means for applying pressure to polish the work; and an alignment mechanism for even contact of the work against said two adjacent polishing drums.

4. A specular polishing apparatus according to claim 1, characterized in that each of said work-holding means has a means for applying pressure to polish the work; and an alignment mechanism for even contact of the work against two adjacent polishing drums.

5. A specular polishing apparatus according to claim 4, characterized in that said pressure is supplied by a weight hanging from each of said work-holding means, and in that the alignment mechanism is composed of a slide member and a rail supporting the work-holding means in such a way that each of said work-holding means can be moved in a direction parallel to a line joining the centers of said two adjacent polishing drums.

6. A specular polishing apparatus according to claim 5, characterized in that said alignment mechanism has a means for absorbing an initial force resulting from contact between said two adjacent polishing drums and the work, said means for absorbing comprising means for applying an impelling force to said work holding means in a direction opposing said initial force.

7. A specular polishing apparatus according to claim 1 characterized in that said polishing drums and said work-holding means can be moved relative to the axial direction of the polishing drums to vary the position of the work at which it contacts the drums.

* * * * *